United States Patent
Yoon et al.

(10) Patent No.: US 9,740,323 B2
(45) Date of Patent: Aug. 22, 2017

(54) TOUCH SENSOR INCLUDING NANOWIRE ARRAY AND METHOD OF FABRICATING THE SAME

(71) Applicant: GWANGJU INSTITUTE OF SCIENCE AND TECHNOLOGY, Gwangju (KR)

(72) Inventors: Myung-Han Yoon, Gwangju (KR); Jaehyuk Lee, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 0 days.

(21) Appl. No.: 14/575,263

(22) Filed: Dec. 18, 2014

(65) Prior Publication Data
US 2015/0205423 A1    Jul. 23, 2015

(30) Foreign Application Priority Data
Jan. 23, 2014    (KR) .................. 10-2014-0008285

(51) Int. Cl.
*G06F 3/045*    (2006.01)
*G06F 3/041*    (2006.01)

(52) U.S. Cl.
CPC .. *G06F 3/0414* (2013.01); *G06F 2203/04103* (2013.01); *Y10S 977/762* (2013.01); *Y10S 977/936* (2013.01); *Y10S 977/952* (2013.01); *Y10S 977/956* (2013.01)

(58) Field of Classification Search
CPC ......... G06F 3/0414; G06F 2203/04103; Y10S 977/762; Y10S 977/936; Y10S 977/952; Y10S 977/956
See application file for complete search history.

(56) References Cited

U.S. PATENT DOCUMENTS

| | | | | |
|---|---|---|---|---|
| 2006/0008942 A1* | 1/2006 | Romano | ............... | B82Y 10/00 438/99 |
| 2006/0134883 A1* | 6/2006 | Hantschel | .............. | B82Y 10/00 438/458 |
| 2010/0253184 A1* | 10/2010 | Choi | ........................ | H02N 2/18 310/339 |
| 2011/0049579 A1* | 3/2011 | Dumitru | ................ | B82Y 10/00 257/254 |
| 2011/0163636 A1* | 7/2011 | Sirbuly | ................. | B82Y 30/00 310/339 |

(Continued)

OTHER PUBLICATIONS

(Supportive Materials for Exception on Jan. 9, 2014) Jaehyuk Lee et al., Fabrication of Vertically Aligned Polymer Nanowire Arrays with High Aspect Ratios for Tactile Sensor Application, Jan. 9, 2014, 6pages, Gwangju Institute of Science and Technology, Bio-Electronics Materials Laboratory Department of Materials Science & Engineering.

*Primary Examiner* — Kent Chang
*Assistant Examiner* — Mark Edwards
(74) *Attorney, Agent, or Firm* — Hauptman Ham, LLP (57) ABSTRACT

Disclosed are a touch sensor and a method of fabricating the same. An insulator of the touch sensor contains a polymer and has an array of vertically aligned nanowires structure. Therefore, the touch sensor can be easily changed in thickness, which facilitates change in electrostatic capacity, thereby increasing sensitivity of the touch sensor. In addition, the present invention can simplify an existing complicated process of fabricating a touch sensor.

11 Claims, 12 Drawing Sheets

(56) References Cited

U.S. PATENT DOCUMENTS

| | | | |
|---|---|---|---|
| 2011/0204317 A1* | 8/2011 | Park | B82Y 30/00 257/9 |
| 2013/0049531 A1* | 2/2013 | Wang | H02N 1/04 310/309 |
| 2015/0220199 A1* | 8/2015 | Wang | G06F 3/16 345/173 |

* cited by examiner

TOUCH SENSOR INCLUDING NANOWIRE ARRAY AND METHOD OF FABRICATING THE SAME

CROSS REFERENCE TO RELATED APPLICATION

This application claims the benefit of Korean Patent Application No. 10-2014-0008285, filed on Jan. 23, 2014, entitled "TOUCH SENSOR INCLUDING NANOWIRE ARRAY AND METHOD OF FABRICATING THE SAME", which is hereby incorporated by reference in its entirety into this application.

BACKGROUND

1. Technical Field

The present invention relates to a thin film transistor for touch sensors, and more particularly, to a touch sensor including a nanowire array arranged perpendicular to an electrode.

2. Description of the Related Art

Touch sensors for sensing external force are broadly divided into a pressure sensitive type, a capacitive type, an infrared type, and an acoustic wave type depending upon implementation principles and operating methods thereof.

In recent years, technologies have been investigated to use a thin film transistor (TFT) as a touch sensor.

Particularly, there have been developed technologies for employing an insulation layer of a TFT with a vertical structure for a touch sensor. Such a touch sensor has a characteristic in that the insulation layer is partially changed in thickness under external force. This causes change in electrostatic capacity, thereby operating the touch sensor.

Although an insulation layer of a TFT is formed in a vertical structure in the related art, it is difficult to sense a fine substance such as a cell having a length of several micrometers or less, and fabrication processes are complicated.

In addition, touch sensors have been developed using a material exhibiting a piezoelectric effect, by which the material is compressed in response to applied force to induce electricity, and employed for electronic appliances such as keyboards. Touch sensors using such a material exhibiting the piezoelectric effect can be more simply and easily fabricated than existing touch sensors. However, touch sensors fabricated in film form still have difficulty in sensing fine substances.

BRIEF SUMMARY

The present invention has been conceived to solve the problems in the art and it is an aspect of the present invention to provide a touch sensor including an array of vertically aligned nanowires to enhance sensitivity to fine substances.

It is another aspect of the present invention to provide a method of fabricating a touch sensor including an array of vertically aligned nanowires to simplify an existing complicated process of fabricating a transistor for touch sensors.

In accordance with one aspect of the present invention, a touch sensor is provided. The touch sensor includes: a first electrode; an insulator placed on the first electrode and including an array of polymer nanowires arranged perpendicular to the first electrode; and a second electrode placed on the insulator.

The touch sensor may have a metal-insulator-metal capacitor structure, and the polymer nanowires may include at least one selected from the group consisting of polyethylene (PE), polypropylene (PP), polystyrene (PS), polyvinyl chloride (PVC), polymethyl methacrylate (PMMA), epoxy, polyimide, polyurethane, polyamide, polyester, and poly (vinyl acetate). The polymer nanowires may include a piezoelectric polymer, and the piezoelectric polymer may include at least one selected from the group consisting of PVDF, PVDF-TrFE, and PVDF-TeFE. The insulator may include an insulation layer and an array of polymer nanowires placed on an upper or lower side of the insulation layer, and the second electrode may enclose only the polymer nanowires or an upper portion of the insulator, or may be disposed in layer form on the polymer nanowires. The second electrode may be a flexible electrode and the polymer nanowires may have a diameter of 10 nm to 100 nm.

In accordance with another aspect of the present invention, a touch sensor is provided.

The touch sensor includes: a gate electrode; an insulator placed on the gate electrode and including an array of polymer nanowires arranged perpendicular to the gate electrode; a semiconductor layer placed on the insulator; and source and drain electrodes electrically connected to the semiconductor layer.

The polymer nanowires may include at least one selected from the group consisting of polyethylene (PE), polypropylene (PP), polystyrene (PS), polyvinyl chloride (PVC), polymethyl methacrylate (PMMA), epoxy, polyimide, polyurethane, polyamide, polyester, and poly(vinyl acetate). The polymer nanowires may include a piezoelectric polymer. The piezoelectric polymer may include at least one selected from the group consisting of PVDF, PVDF-TrFE, and PVDF-TeFE. The insulator may include an insulation layer and an array of polymer nanowires placed on the insulation layer, and the polymer nanowires may have a diameter of 10 nm to 100 nm.

In accordance with a further aspect of the present invention, a touch sensor is provided.

The touch sensor includes: a substrate; a gate electrode placed above the substrate; an insulator interposed between the substrate and the gate electrode and including an array of polymer nanowires arranged perpendicular to the gate electrode; a semiconductor layer interposed between the insulator and the substrate, or between the insulator and the gate electrode; and source and drain electrodes electrically connected to the semiconductor layer.

The gate electrode may be a flexible substrate.

In accordance with yet another aspect of the present invention, a method of fabricating a touch sensor is provided.

The method includes forming a first electrode; forming, on the first electrode, an insulator including an array of polymer nanowires arranged perpendicular to the first electrode; and forming a second electrode on the insulator.

Forming an insulator may include: forming a PDMS mold by injecting a mixed solution containing PDMS into a silicon master, an upper portion of which has a shape of vertically aligned polymer nanowires, followed by curing the mixed solution; and forming an array of vertically aligned nanowires containing the polymer by injecting a mixed solution containing the polymer into the PDMS mold, followed by curing the mixed solution. The polymer may include at least one selected from the group consisting of polyethylene (PE), polypropylene (PP), polystyrene (PS), polyvinyl chloride (PVC), polymethyl methacrylate (PMMA), epoxy, polyimide, polyurethane, polyamide, polyester, and poly(vinyl acetate). The polymer may include a piezoelectric polymer, and the piezoelectric polymer may include at least one selected from the group consisting of PVDF, PVDF-TrFE, and PVDF-TeFE.

According to embodiments of the invention, a touch sensor including an array of vertically aligned nanowires can achieve enhanced sensitivity to fine substances.

In addition, according to the embodiments of the invention, it is possible to simplify the existing complicated process of fabricating a touch sensor.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Hereinafter, exemplary embodiments of the present invention will be described in detail with reference to the accompanying drawings. However, it should be understood that the present invention can be embodied in different forms without being limited to the embodiments disclosed herein and covers all equivalents and alternatives falling within the spirit and scope of the invention.

It will be understood that when a layer is referred to as being "on" another layer or substrate, it can be directly formed on the other layer or substrate, or an intervening layer(s) may also be present. In addition, spatially relative terms, such as "above," "upper (portion)," "upper surface," and the like may be understood as meaning "below," "lower (portion)," "lower surface," and the like according to a reference orientation. In other words, the expressions of spatial orientations are to be construed as indicating relative orientations instead of absolute orientations. Further, it will be understood that the terms "first", "second", "third", and the like are used to distinguish elements without imposing a restriction on the elements.

In the drawings, the thicknesses of layers and regions can be exaggerated or omitted for clarity. The same components will be denoted by the same reference numerals throughout the specification.

In the following description of the present invention, descriptions of details apparent to those skilled in the art will be omitted for clarity.

Figure 1:
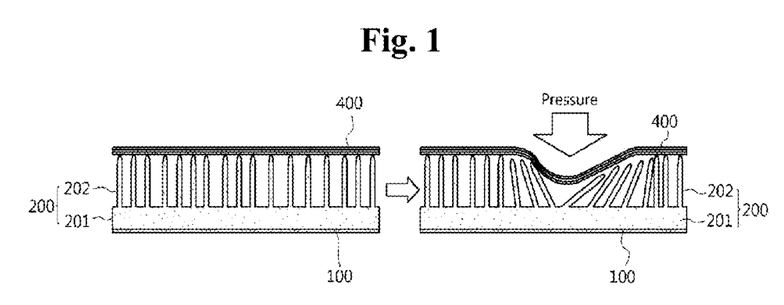
FIGS. 1 to 3 are sectional views of a thin film transistor for touch sensors according to one embodiment of the present invention.
Figure 2:
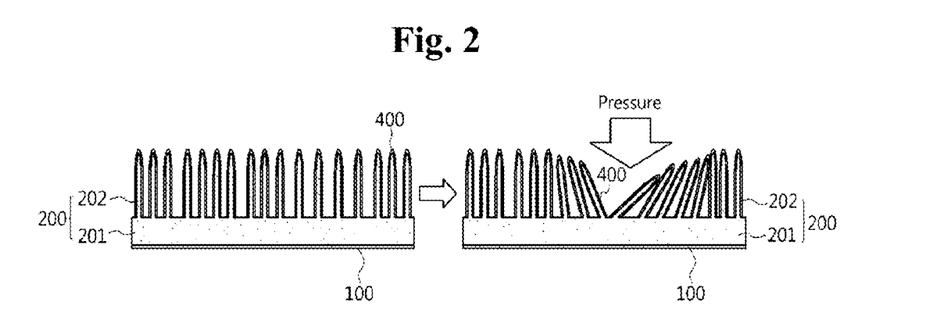
Figure 3:
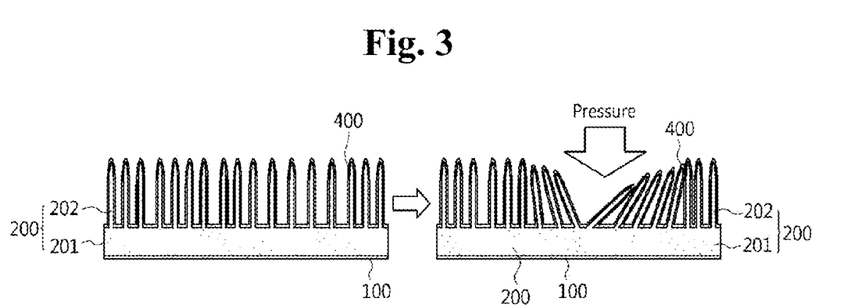
Figure 4:
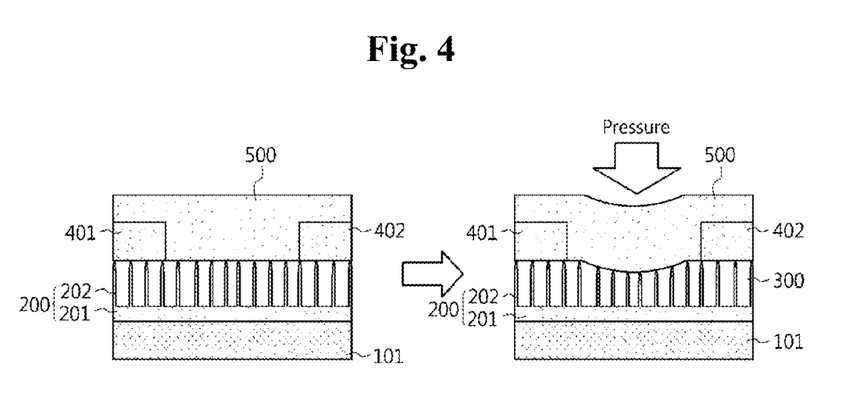
FIGS. 4 to 11 are sectional views of thin film transistors for touch sensors according to other embodiments of the present invention.

FIGS. 1 to 3 are sectional views of a thin film transistor for touch sensors according to one embodiment of the invention.

Referring to FIGS. 1 to 3, a thin film transistor for touch sensors according to one embodiment of the invention includes a first electrode 100, an insulator 200 placed on the first electrode 100 and including an array of polymer nanowires arranged perpendicular to the first electrode 100, and a second electrode 400.

First, the first electrode 100 is prepared. The first electrode 100 may include, for example, at least one conductive material selected from the group consisting of gold (Au), platinum (Pt), silver (Ag), nickel (Ni), copper (Cu), aluminum (Al), titanium (Ti), cobalt (Co), iron (Fe), tungsten (W), ruthenium (Ru), rhodium (Rh), palladium (Pd), molybdenum (Mo), cadmium (Cd), chromium (Cr), zinc (Zn), indium (In), yttrium (Yt), lithium (Li), tin (Sn), lead (Pb), alloys thereof, p- or n-doped silicon, zinc oxide, indium oxide, indium tin oxide (ITO), and indium zinc oxide (IZO), without being limited thereto In addition, the first electrode 100 may also act as a substrate.

The insulator 200 is placed on the first electrode 100. The insulator 200 may include an insulation layer 201 and an array of plural insulating polymer nanowires 202 arranged on the insulation layer 201 to be perpendicular to the first electrode 100.

With the insulating polymer nanowires 202, the insulator 200 can be more easily deformed by external force. Therefore, the insulator 200 can be easily changed in thickness, which facilitates change in electrostatic capacity, thereby increasing sensitivity of a touch sensor. As a result, the touch sensor can also sense a microstructure such as a cell.

In this case, the polymer nanowires may have a diameter of 10 nm to 100 nm. When the polymer nanowires have a diameter of 10 nm or less, the polymer nanowire array cannot support the first electrode, the second electrode, or a semiconductor layer which can be formed thereon, thereby making it difficult to maintain the transistor structure.

In addition, when the polymer nanowires have a diameter of 100 nm or more, the touch sensor has low sensitivity, thereby making it difficult to respond to a microstructure such as a cell.

The polymer nanowires may be formed of any insulating polymer including at least one selected from the group consisting of polyethylene (PE), polypropylene (PP), polystyrene (PS), polyvinyl chloride (PVC), polymethyl methacrylate (PMMA), epoxy, polyimide, polyurethane, polyamide, polyester, and poly(vinyl acetate).

The insulator 200 may contain a piezoelectric polymer. Due to piezoelectric effects, the piezoelectric polymer is compressed to generate electricity in response to applied force. In addition, the piezoelectric polymer is light and exhibits excellent flexibility in addition to the piezoelectric properties. Further, when applied to a medium such as a human body, the piezoelectric polymer exhibits excellent matching effects between the piezoelectric material and the medium. Accordingly, the piezoelectric polymer, when used for a touch sensor, can enhance sensitivity of the touch sensor.

The piezoelectric polymer may include at least one selected from the group consisting of polyvinylidene fluoride (PVDF), polyvinylidene fluoride trifluoroethylene (PVDF-TrFE), and polyvinylidene fluoride tetrafluoroethylene (PVDF-TeFE).

Accordingly, as the insulator 200 contains the piezoelectric polymer and has the array of the polymer nanowires arranged perpendicular to the first electrode 100, electricity caused by the piezoelectric effect is increased. As a result, a touch sensor including the insulator 200 exhibits high sensitivity to an extent of sensing a microstructure such as a cell.

The second electrode 400 is placed on the insulator 200.

The second electrode 400 may be formed of a conductive material. The conductive material may include a low resistance metal. For example, the conductive material may be selected from among aluminum (Al), tungsten (W), copper (Cu), nickel (Ni), chromium (Cr), molybdenum (Mo), titanium (Ti), platinum (Pt), and tantalum (Ta). However, the present invention is not limited thereto.

Specifically, the second electrode 400 may be a flexible electrode. When the second electrode is the flexible electrode, the flexible electrode is bent together with the nanowires 202 of the insulator 200 by pressure applied thereto, thereby causing change in electrostatic capacity. The flexible electrode may include a conductive metal oxide or a metal thin film.

The conductive metal oxide may include indium tin oxide-polyethylene terephthalate (ITO-PET), indium zinc oxide (IZO), or In—Ga—Zn—O (IGZO).

The metal thin film may contain Au, Ag, or Ni. In addition, since a flexible gate electrode requires predetermined degrees of transmissivity, conductivity and flexibility, the metal thin film may have a thickness of 1 nm to 20 nm.

The touch sensor formed as described above may have a metal-insulator-metal capacitor structure.

Referring to FIG. 1, a touch sensor having the metal-insulator-metal capacitor structure is shown. Here, the first and second electrodes 100, 400 include at least one selected from the group consisting of Ta, Ti, W, and Mo.

The second electrode 400 may be formed in layer form on the insulator 200. In this case, the second electrode 400 is bent by pressure, whereby the nanowires 202 placed under the second electrode 400 are bent to exhibit direct piezoelectric effects. For this reason, it is desirable that the second electrode 400 be flexible.

Referring to FIG. 2 or 3, the second electrode 400 may enclose only the nanowires 202 (see FIG. 2), or an upper portion of the insulator 200 (see FIG. 3). Thus, it is desirable to use a piezoelectric polymer as the polymer for the touch sensor as shown in FIG. 2 or 3. As a result, the piezoelectric polymer applied to a medium such as a human body can enhance matching effects between the piezoelectric material and the medium, thereby increasing sensitivity of the touch sensor.

FIGS. 4 to 7 are sectional views of touch sensors according to other embodiments of the present invention.

The touch sensors have a bottom gate structure including a gate electrode 101, an insulator 200 placed on the gate electrode and including an array of polymer nanowires arranged perpendicular to the gate electrode, a semiconductor layer 500 placed on the insulator 200, and source and drain electrodes 401, 402 electrically connected to the semiconductor layer.

First, the gate electrode 101 is prepared. The gate electrode 101 may include, for example, at least one conductive material selected from the group consisting of gold (Au), platinum (Pt), silver (Ag), nickel (Ni), copper (Cu), aluminum (Al), titanium (Ti), cobalt (Co), iron (Fe), tungsten (W), ruthenium (Ru), rhodium (Rh), palladium (Pd), molybdenum (Mo), cadmium (Cd), chromium (Cr), zinc (Zn), indium (In), yttrium (Yt), lithium (Li), tin (Sn), lead (Pb), alloys thereof, p- or n-doped silicon, zinc oxide, indium oxide, indium tin oxide (ITO), and indium zinc oxide (IZO), without being limited thereto In addition, the gate electrode 101 may also serve as a substrate.

When the gate electrode 101 is formed in a bottom structure, a separate substrate is not used. Therefore, the entire volume of a device can be reduced, thereby achieving high integration.

The insulator 200 is placed on the gate electrode 101.

The insulator 200 may have a structure in which an insulation layer 201 is provided at an upper portion thereof with an array of insulating polymer nanowires 202 arranged perpendicular to the first electrode 100.

The insulator 200 can be more easily deformed by external force due to the insulating polymer nanowires 202. Therefore, the insulator 200 can be easily changed in thickness, which facilitates change in electrostatic capacity, thereby increasing sensitivity of the touch sensor. As a result, the touch sensor can also sense a microstructure such as a cell.

In this case, the polymer nanowires 202 may have a diameter of 10 nm to 100 nm. When the polymer nanowires have a diameter of 10 nm or less, the array of vertically aligned nanowires cannot support the source and drain electrodes, the gate electrode, or the semiconductor layer which may be formed thereon. As a result, it is difficult to maintain the transistor structure.

In addition, when the polymer nanowires have a diameter of 100 nm or more, the touch sensor has low sensitivity, thereby making it difficult to respond to a microstructure such as a cell.

The polymer nanowires may be formed of any insulating polymer, including at least one selected from the group consisting of polyethylene (PE), polypropylene (PP), polystyrene (PS), polyvinyl chloride (PVC), polymethyl methacrylate (PMMA), epoxy, polyimide, polyurethane, polyamide, polyester, and poly(vinyl acetate).

The insulator 200 contains a piezoelectric polymer. Due to piezoelectric effects, the piezoelectric polymer is compressed to generate electricity in response to applied force. In addition, the piezoelectric polymer is light and exhibits excellent flexibility in addition to the piezoelectric properties. Further, when applied to a medium such as a human body, the piezoelectric polymer exhibits excellent matching effects between the piezoelectric material and the medium. Accordingly, the piezoelectric polymer, when used for a touch sensor, can enhance sensitivity of the touch sensor.

The piezoelectric polymer may include at least one selected from the group consisting of PVDF, PVDF-TrFE, and PVDF-TeFE.

Accordingly, as the insulator 200 contains the piezoelectric polymer and has the array of the polymer nanowires arranged perpendicular to the gate electrode 101, electricity caused by the piezoelectric effect is increased. As a result, the touch sensor including the insulator 200 exhibits high sensitivity to an extent of sensing a microstructure such as a cell.

Figure 5:
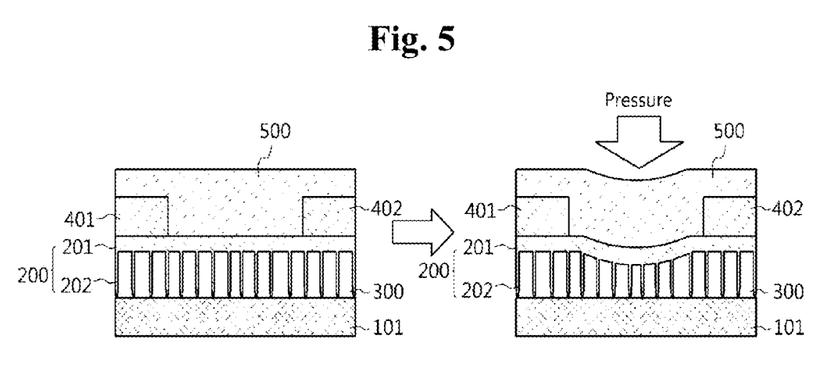
Figure 6:
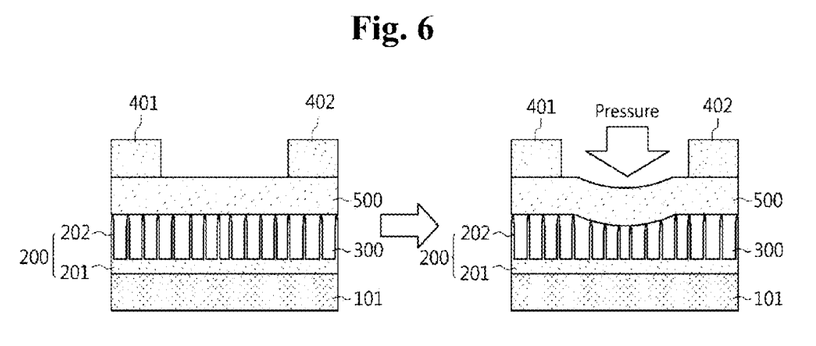
Figure 7:
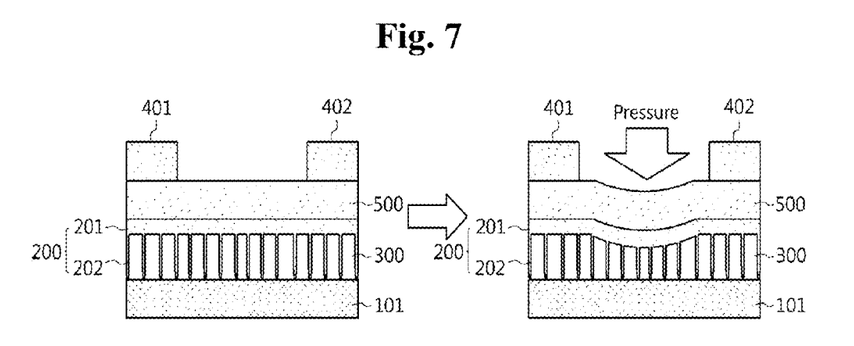

The nanowires 202 may be arranged oriented upwards with respect to the gate electrode 101 (see FIG. 4 or 6), or arranged towards the gate electrode 101 (see FIG. 5 or 7).

The semiconductor layer 500 is placed on the insulator 200 and electrically connected to the source and drain electrodes 401, 402.

The semiconductor layer 500 may include an organic semiconductor material or an inorganic semiconductor material.

The organic semiconductor material may include a p-type or n-type organic semiconductor material. The p-type organic semiconductor material may include a liquid to crystal polyfluorene block copolymer (LCPBC), polythiophene, pentacene, poly-3-hexylthiophene (P3HT), fluorene-bithiophene, F8T2 (poly(9,9'-dioctylfluorene-co-bithiophene)), PQT-12 (poly(3,3'-didodecylquaterthiophene), and the like. The n-type organic semiconductor material may include lutetium bisphthalocyanine, thulium bisphthalocyanine, tetracyanoquinodimethane (TCNQ), C60, C70, or the like.

In addition, the inorganic semiconductor material may be an n-type or p-type semiconductor material, and may include ZnO, InO, GaO, SnO, or In—Ga—Zn—O (IGZO).

The thickness of the semiconductor layer 500 is restricted depending upon used semiconductor materials so as to ensure transparency. For example, a pentacene semiconductor layer may have a thickness of 20 nm to 50 nm to ensure transparency. In another example, a semiconductor layer formed of P3HT may have a thickness of 10 nm to 5 nm.

The source electrode 401 and the drain electrode 402 may be formed of a conductive material. The conductive material may be a metal having low resistance. For example, the conductive material may be selected from among aluminum (Al), tungsten (W), copper (Cu), nickel (Ni), chromium (Cr), molybdenum (Mo), titanium (Ti), platinum (Pt), and tantalum (Ta). However, the present invention is not limited thereto.

The semiconductor layer 500 may cover the source and drain electrodes 401, 402 and may be embedded between the source and drain electrodes 401, 402. Therefore, the source and drain electrodes 401, 402 may have a bottom contact structure (see FIG. 4 or 5). Alternatively, the source and drain electrodes 401, 402 may have a top contact structure (see FIG. 6 or 7).

The top contact structure refers to a structure in which a semiconductor layer is placed under the source and drain electrodes.

In contrast, the bottom contact structure refers to a structure in which a semiconductor layer covers the source and drain electrodes.

The plural nanowires 202 of the insulator 200 are separated from each other to form an array, whereby air gaps 300 can be formed therebetween.

FIGS. 8 to 11 are sectional views of touch sensors according to other embodiments of the present invention.

Referring to FIGS. 8 to 11, the touch sensors according to the embodiments of the invention have a top gate structure including a substrate 10, a gate electrode 101 placed above the substrate 10, an insulator 200 interposed between the substrate and the gate electrode and including an array of polymer nanowires arranged perpendicular to the gate electrode 101, source and drain electrodes 401, 402 placed on the insulator 200 or the substrate 10 to face each other, and a semiconductor layer 500 electrically connected to the source and drain electrodes 401, 402.

First, the substrate 10 is prepared. Any transparent substrate may be used as the substrate 10 without limitation. The substrate 10 may include a glass substrate, an ITO substrate, or an IZO substrate. In addition, the substrate 10 may be omitted in some cases.

The gate electrode 101 is placed above the substrate 10. For detailed descriptions of the gate electrode 101, refer to the content described above.

However, for the top gate structure, the gate electrode 101 may be a flexible electrode. For detailed descriptions of the flexible electrode, refer to the content described above.

The insulator 200 is interposed between the substrate 10 and the gate electrode 101. For detailed descriptions of the insulator 200, refer to the content described above.

Figure 8:
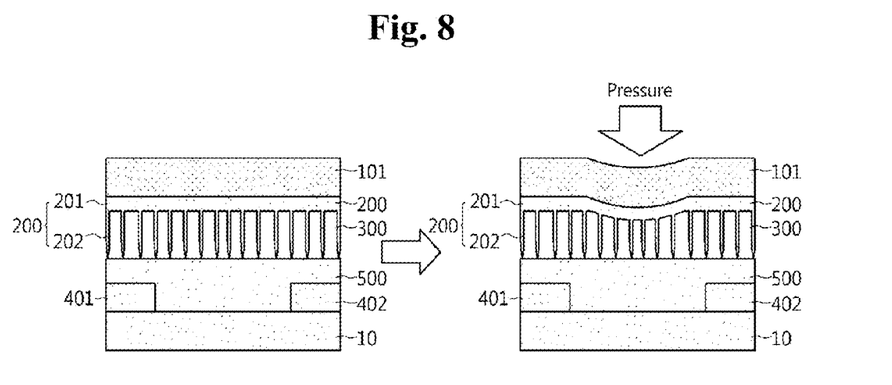
Figure 9:
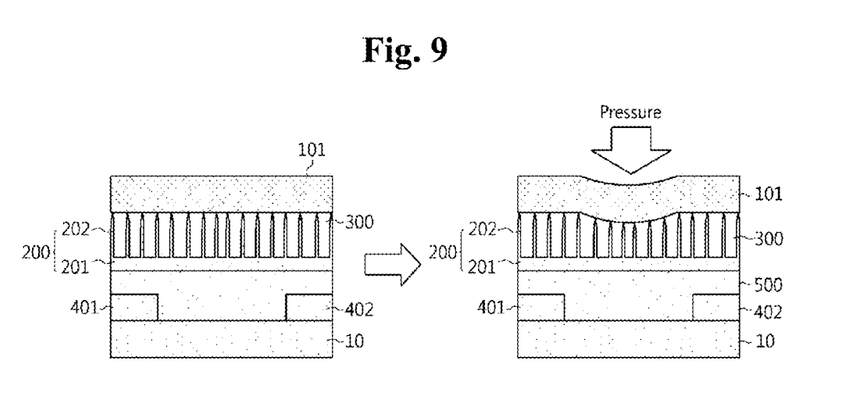
Figure 10:
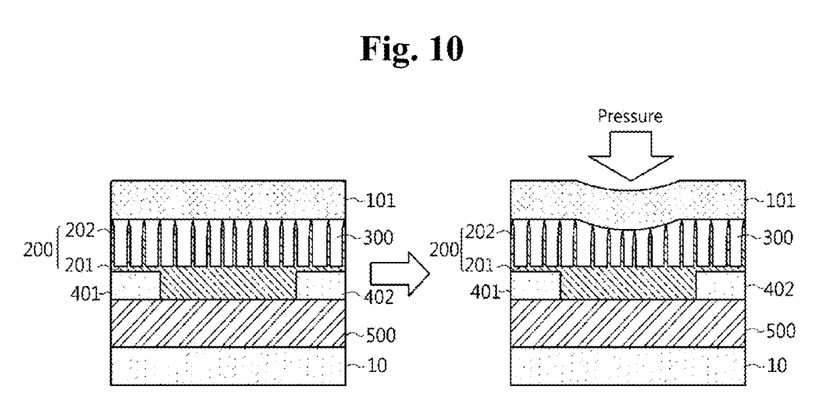
Figure 11:
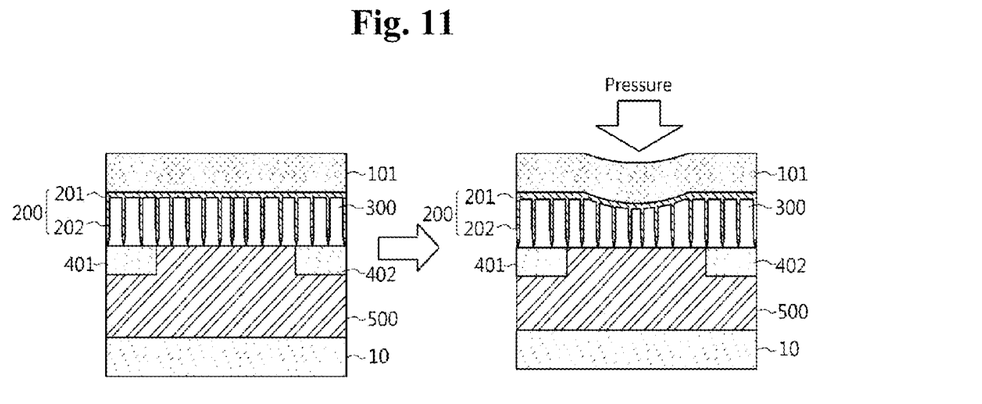

The nanowires 202 may be arranged oriented upward with respect to the substrate 10 (see FIG. 9 or 10), or arranged toward the substrate 10 (see FIG. 8 or 11).

The source and drain electrodes 401, 402 are placed on the insulator 200 or the substrate 10 to face each other and are electrically connected to the semiconductor layer 500.

The semiconductor layer 500 may cover the source and drain electrodes 401, 402 and may be embedded between the source and drain electrodes 401, 402. Therefore, the source and drain electrodes 401, 402 may have a bottom contact structure (see FIG. 8 or 9). Alternatively, the source and drain electrodes 401, 402 may have a top contact structure (see FIG. 10 or 11).

A method of fabricating a thin film transistor for touch sensors according to one embodiment of the present invention will be described below.

In the fabrication method, a first electrode is first formed.

The first electrode may be formed of the first electrode material described above and may be formed by a typical deposition process such as metal deposition, sputtering, or sol-gel deposition, or a solution process-based method.

Thereafter, an insulator including an array of polymer nanowires arranged perpendicular to the first electrode is formed on the first electrode.

Figure 12:
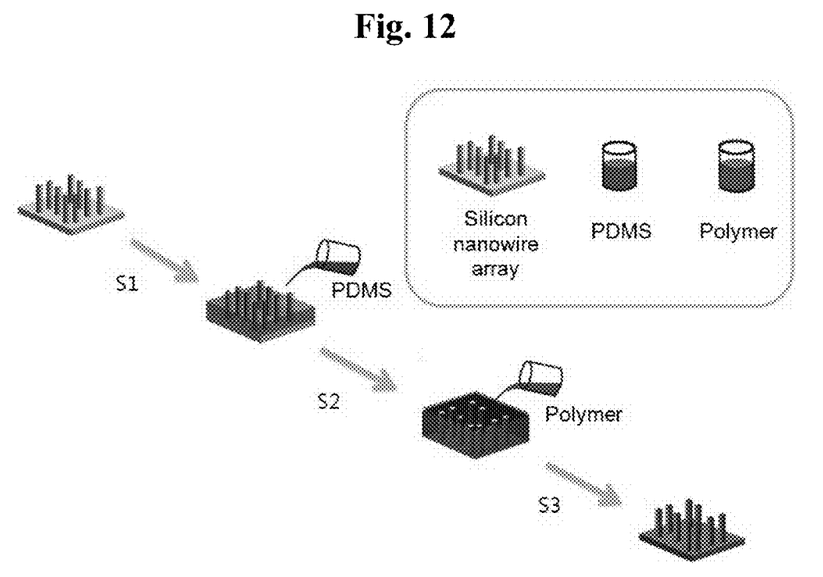
FIG. 12 shows a process of forming an array of vertically aligned nanowires containing polymer according to one embodiment of the present invention.

FIG. 12 shows a process of forming an array including polymer nanowires according to one embodiment of the present invention.

Referring to FIG. 12, in forming the insulator, a polydimethylsiloxane (PDMS) mold is first formed by injecting a mixed solution containing PDMS into a silicon master, an upper portion of which has a shape of an array of vertically aligned nanowires, followed by curing the PDMS.

The silicon master is characterized in that horizontal and vertical lengths thereof are different from each other as in ellipses or rectangles, and may be designed to have a convex pattern. When the silicon master is designed to have a circular pattern, it is possible to adjust the size of a final fine pattern. In addition, when the silicon master has a pattern with different horizontal and vertical lengths, it is possible to adjust the size and shape of the pattern in various ways depending upon thickness of a polymer thin film and process time of reactive ion etching (RIE).

A mixed solution containing PDMS is injected into the pattern of the silicon master to form a PDMS mold. Here, the PDMS mold refers to a master shaped after the pattern of the silicon master, by spin-coating the mixed solution containing PDMS onto the silicon master, followed by curing the coated solution. The PDMS mold may stably serve as the master owing to high hardness thereof.

Then, an array composed of the aforementioned nanowires is formed by injecting a mixed solution containing polymer into the PDMS mold, followed by curing the solution.

The polymer mixed solution may be prepared by mixing piezoelectric polymer powder with a solvent, for example, tetrahydrofuran (THF, $C_4H_5O$), methyl ethyl ketone (MEK, $C_4H_8O$), acetone ($C_3H_6O$), dimethylformamide (DMF, $C_3H_7NO$), dimethyl sulfoxide (DMSO, $C_2H_6OS$), or the like.

The polymer nanowires may be formed of any insulating polymer including at least one selected from the group consisting of polyethylene (PE), polypropylene (PP), polystyrene (PS), polyvinyl chloride (PVC), polymethyl methacrylate (PMMA), epoxy, polyimide, polyurethane, polyamide, polyester, and poly(vinyl acetate).

The polymer may be a piezoelectric polymer including at least one selected from the group consisting of PVDF, PVDF-TrFE, and PVDF-TeFE.

Although it is desirable to cure the mixed solution at room temperature after injection into the PDMS mold, the present invention is not limited thereto.

Since the array of the nanowires is formed using the PDMS mold, it is possible to form the array in nanoscale through a simple process. In addition, this method provides economic advantages of reducing process costs through the simplified process.

Finally, a second electrode is formed. The second electrode may be formed of the second electrode material described above and may be formed by a typical deposition process such as metal deposition, sputtering, or sol-gel deposition, or a solution process based method.

As described above, in the method of fabricating a thin film transistor for touch sensors according to the embodiment of the invention, an insulator is formed to include an array of plural polymer nanowires arranged perpendicular to the first electrode, thereby enhancing sensitivity of the thin film transistor for touch sensors.

As such, since the insulator contains a polymer and has the array of vertically aligned nanowires structure, the thin film transistors for touch sensors according to the embodiments of the invention can be made light and exhibit excellent flexibility.

In addition, when the polymer is a piezoelectric polymer and applied to a medium such as a human body, the piezoelectric polymer exhibits excellent matching effects between the piezoelectric material and the medium. Further, the insulator can be more easily deformed by external force. Therefore, the insulator may be easily changed in thickness, which facilitates change in electrostatic capacity, thereby increasing sensitivity of the touch sensor.

Furthermore, in the method of fabricating a thin film transistor for touch sensors according to the embodiment of the invention, the array of vertically aligned nanowires is fabricated through a PDMS mold, thereby making it possible to fabricate the array in nanoscale through a simple process. Moreover, the method according to the embodiment of the invention provides economic advantages of reducing process costs through the simplified process.

Although some embodiments have been described above, it should be understood that the present invention is not limited thereto, and that various modifications, changes, and variations can be made by those skilled in the art without departing from the spirit and scope of the present invention.

What is claimed is:

1. A touch sensor comprising:
   a first electrode;
   an insulator placed on the first electrode, wherein the insulator comprises:
      an insulation layer, and
      an array of polymer nanowires erected on the insulation layer and arranged perpendicular to the first electrode,
      wherein each polymer nanowire of the array of polymer nanowires comprises:
         at least one selected from the group consisting of polyethylene (PE), polypropylene (PP), polystyrene (PS), polyvinyl chloride (PVC), polymethyl methacrylate (PMMA), epoxy, polyimide, polyurethane, polyamide, polyester, and poly(vinyl acetate); and
         at least one piezoelectric polymer selected from the group consisting of PVDF, PVDF-TrFE, and PVDF-TeFE; and
   a second electrode placed on the insulator,
   wherein the insulator insulates the first electrode and the second electrode, and
   wherein the second electrode contacts the insulator.

2. The touch sensor according to claim 1, wherein the touch sensor has a metal-insulator-metal capacitor structure.

3. The touch sensor according to claim 1, wherein the polymer nanowires are placed on an upper or lower side of the insulation layer.

4. The touch sensor according to claim 1, wherein the second electrode encloses only the polymer nanowires or an upper portion of the insulator, or is disposed in layer form on the polymer nanowires.

5. The touch sensor according to claim 1, wherein the second electrode is a flexible electrode.

6. The touch sensor according to claim 1, wherein the polymer nanowires have a diameter of 10 nm to 100 nm.

7. A touch sensor comprising:
   a gate electrode;
   an insulator placed on the gate electrode, wherein the insulator comprises:
      an insulation layer, and
      an array of polymer nanowires erected on the insulation layer and arranged perpendicular to the gate electrode,
      wherein each polymer nanowire of the array of polymer nanowires comprises: at least one selected from the group consisting of polyethylene (PE), polypropylene (PP), polystyrene (PS), polyvinyl chloride (PVC), polymethyl methacrylate (PMMA), epoxy, polyimide, polyurethane, polyamide, polyester, and poly(vinyl acetate); and
      at least one piezoelectric polymer selected from the group consisting of PVDF, PVDF-TrFE, and PVDF-TeFE; and
   a semiconductor layer placed on the insulator; and
   source and drain electrodes electrically connected to the semiconductor layer, wherein the insulator insulates the gate electrode and the semiconductor layer, and
   wherein the semiconductor layer contacts the insulator.

8. The touch sensor according to claim 7, wherein the polymer nanowires are placed on the insulation layer.

9. The touch sensor according to claim 7, wherein the polymer nanowires have a diameter of 10 nm to 100 nm.

10. A touch sensor comprising:
    a substrate;
    a gate electrode above the substrate;
    an insulator interposed between the substrate and the gate electrode, wherein the insulator comprises:
       an insulation layer, and
       an array of polymer nanowires erected on the insulation layer and arranged perpendicular to the gate electrode,
       wherein each polymer nanowire of the array of polymer nanowires comprises:
          at least one selected from the group consisting of polyethylene (PE), polypropylene (PP), polystyrene (PS), polyvinyl chloride (PVC), polymethyl methacrylate (PMMA), epoxy, polyimide, polyurethane, polyamide, polyester, and poly(vinyl acetate); and
          at least one piezoelectric polymer selected from the group consisting of PVDF, PVDF-TrFE, and PVDF-TeFE; and
    a semiconductor layer interposed between the insulator and the substrate; and
    source and drain electrodes electrically connected to the semiconductor layer,
    wherein the insulator insulates the gate electrode and the semiconductor layer, and
    wherein the gate electrode contacts the insulator.

11. The touch sensor according to claim 10, wherein the gate electrode is a flexible substrate.

* * * * *